(12) United States Patent
Hellmich et al.

(10) Patent No.: US 6,173,692 B1
(45) Date of Patent: Jan. 16, 2001

(54) TIME DELAY IGNITION CIRCUIT FOR AN INTERNAL COMBUSTION ENGINE

(75) Inventors: Wolfram Hellmich, Munich (DE); Todd D. Craft, Kenosha, WI (US); Gregory J. Binversie, Grayslake, IL (US); Philip J. Bylsma, Brookfield, WI (US)

(73) Assignee: Outboard Marine Corporation, Waukegan, IL (US)

( * ) Notice: Under 35 U.S.C. 154(b), the term of this patent shall be extended for 0 days.

(21) Appl. No.: 09/204,697

(22) Filed: Dec. 3, 1998

Related U.S. Application Data

(63) Continuation of application No. PCT/US97/10636, filed on Jun. 20, 1997.
(60) Provisional application No. 60/020,032, filed on Jun. 21, 1996.

(51) Int. Cl.$^7$ .................................................. F02D 41/04
(52) U.S. Cl. .................. 123/305; 123/335; 123/406.47; 123/478
(58) Field of Search ..................... 123/295, 305, 123/334, 335, 406.47, 406.52, 406.59, 478, 480

(56) References Cited

U.S. PATENT DOCUMENTS

| | | | |
|---|---|---|---|
| 2,918,913 | 12/1959 | Guiot | 123/476 |
| 3,835,819 | 9/1974 | Anderson, Jr. | 123/406.47 |
| 3,892,207 | 7/1975 | Weise et al. | 123/305 |
| 3,969,614 | 7/1976 | Moyer et al. | 701/103 |
| 4,099,495 | 7/1978 | Kiencke et al. | 123/480 |
| 4,111,178 | 9/1978 | Casey | 123/305 |
| 4,163,282 | 7/1979 | Yamada et al. | 701/108 |
| 4,181,944 | 1/1980 | Yamauchi et al. | 701/108 |
| 4,201,159 | 5/1980 | Kawai et al. | 123/406.47 |
| 4,244,023 | 1/1981 | Johnson | 701/110 |
| 4,250,858 | 2/1981 | Jeenicke et al. | 123/480 |
| 4,259,723 | 3/1981 | Fujisawa et al. | 701/102 |
| 4,266,274 | 5/1981 | Barman | 701/108 |
| 4,267,569 | 5/1981 | Baumann et al. | 701/99 |
| 4,267,810 | 5/1981 | Wesemeyer et al. | 123/406.61 |
| 4,336,778 | 6/1982 | Howard | 123/334 |
| 4,380,989 | 4/1983 | Takaki | 123/644 |
| 4,479,467 | 10/1984 | Burrows et al. | 123/606 |
| 4,483,473 | 11/1984 | Wagdy | 277/8 |
| 4,483,474 | 11/1984 | Nikolich | 277/8 |
| 4,621,599 | 11/1986 | Igashira et al. | 123/300 |
| 4,703,732 | 11/1987 | Wineland et al. | 123/406.47 |
| 4,785,783 | 11/1988 | Oshiage et al. | 123/406.47 |
| 4,936,275 | 6/1990 | Takeda | 123/406.65 |
| 4,944,271 | 7/1990 | Iwata et al. | 123/435 |
| 4,986,245 | 1/1991 | Nakaniwa et al. | 123/492 |
| 5,009,208 | 4/1991 | Florenza, II | 123/335 |
| 5,014,669 | 5/1991 | Takasakie et al. | 123/406.55 |
| 5,050,562 | 9/1991 | Ishii et al. | 123/674 |
| 5,058,550 | 10/1991 | Nagano et al. | 123/406.46 |
| 5,069,182 | 12/1991 | Kako | 123/406.47 |
| 5,078,107 | 1/1992 | Morikawa | 123/295 |
| 5,086,737 | 2/1992 | Watanabe et al. | 123/305 |

(List continued on next page.)

FOREIGN PATENT DOCUMENTS

| | | |
|---|---|---|
| 2719809 | 12/1977 | (DE) . |
| 4020298 | 10/1991 | (DE) . |
| 1271399 | 1/1962 | (FR) . |
| 2122684 | 1/1984 | (GB) . |
| 86948 | 4/1993 | (JP) . |

*Primary Examiner*—Willis R. Wolfe

(57) ABSTRACT

An internal combustion engine assembly including an internal combustion engine including an engine block having at lest one cylinder, a piston mounted within the cylinder for reciprocal movement in the cylinder, a fuel injector for injecting fuel into the cylinder, the fuel injector initiating a fuel injection event at a predetermined time and a circuit for generating a spark in the cylinder a predetermined amount of time after the injection event to cause combustion of fuel in the cylinder.

32 Claims, 8 Drawing Sheets

U.S. PATENT DOCUMENTS

| | | | |
|---|---|---|---|
| 5,095,437 | 3/1992 | Shibata et al. | 701/102 |
| 5,101,787 | 4/1992 | Kako | 123/406.47 |
| 5,127,378 | 7/1992 | Ito | 123/300 |
| 5,133,329 | 7/1992 | Rodseth et al. | 123/630 |
| 5,148,791 | 9/1992 | Nagano et al. | 123/406.13 |
| 5,163,403 | 11/1992 | Kitagawa et al. | 123/406.45 |
| 5,170,760 | 12/1992 | Yamada et al. | 123/295 |
| 5,174,263 | 12/1992 | Meaney | 123/478 |
| 5,190,008 | 3/1993 | Yamasaki et al. | 123/306 |
| 5,218,945 | 6/1993 | Kappellen et al. | 123/687 |
| 5,267,542 | 12/1993 | Keskula | 123/406.65 |
| 5,277,161 | 1/1994 | Endou | 123/406.53 |
| 5,278,762 | 1/1994 | Kawamura | 701/105 |
| 5,333,583 | 8/1994 | Matsuura | 123/295 |
| 5,335,744 | 8/1994 | Takasuka et al. | 180/197 |
| 5,415,136 | 5/1995 | Doherty et al. | 123/46 SC |

FIG. 5

INJECTION TIMING
(DEGREES BEFORE TOP-DEAD-CENTER("DBTDC"))

| y1/x1 | 200 | 400 | 500 | 600 | 700 | 800 | 900 | 1000 | 1100 | 1200 | 1300 | 1400 | 1500 | 2000 | 2500 | 3000 | 3500 | 4000 | 4500 | 5000 | 5500 | 7000 | |
|---|---|---|---|---|---|---|---|---|---|---|---|---|---|---|---|---|---|---|---|---|---|---|---|
| 0 | 21 | 15 | 10 | 9 | 7 | 6 | 5 | 5 | 5 | 5 | 5 | 5 | 5 | 5 | 5 | 5 | 5 | 5 | 5 | 5 | 5 | 5 | REPRESENTS MOMENT, IN DBTDC, WHEN CURRENT BEGINS TO FLOW IN INJECTOR COIL |
| 50 | 30 | 30 | 30 | 30 | 30 | 30 | 31 | 35 | 40 | 40 | 40 | 40 | 40 | 40 | 40 | 40 | 40 | 40 | 40 | 40 | 40 | 40 | |
| 100 | 70 | 70 | 70 | 70 | 70 | 70 | 70 | 70 | 70 | 70 | 75 | 75 | 75 | 95 | 95 | 95 | 95 | 95 | 95 | 95 | 95 | 95 | |
| 150 | 60 | 60 | 60 | 60 | 60 | 60 | 65 | 70 | 80 | 85 | 85 | 90 | 90 | 95 | 95 | 95 | 95 | 95 | 95 | 95 | 95 | 95 | |
| 151 | 155 | 155 | 155 | 155 | 155 | 155 | 155 | 155 | 150 | 145 | 140 | 140 | 140 | 150 | 160 | 160 | 160 | 160 | 160 | 160 | 160 | 160 | REPRESENTS MOMENT, IN DBTDC, WHEN FUEL SPRAY FROM INJECTOR INTO COMBUSTION CHAMBER BEGINS |
| 200 | 210 | 210 | 210 | 210 | 210 | 210 | 210 | 200 | 185 | 205 | 200 | 195 | 195 | 195 | 200 | 205 | 205 | 205 | 205 | 205 | 205 | 205 | |
| 300 | 205 | 205 | 205 | 215 | 215 | 215 | 210 | 205 | 185 | 190 | 195 | 185 | 185 | 200 | 200 | 195 | 205 | 205 | 210 | 215 | 215 | 215 | |
| 400 | 205 | 205 | 205 | 215 | 215 | 213 | 210 | 205 | 190 | 205 | 195 | 195 | 185 | 195 | 205 | 205 | 205 | 215 | 220 | 215 | 215 | 215 | |
| 500 | 210 | 210 | 210 | 215 | 215 | 213 | 210 | 210 | 195 | 195 | 205 | 200 | 200 | 200 | 205 | 205 | 210 | 215 | 220 | 215 | 215 | 215 | |
| 600 | 210 | 210 | 210 | 215 | 215 | 213 | 210 | 210 | 195 | 205 | 190 | 195 | 190 | 205 | 205 | 195 | 210 | 215 | 205 | 220 | 215 | 215 | |
| 700 | 210 | 210 | 210 | 215 | 215 | 215 | 210 | 210 | 210 | 205 | 210 | 210 | 210 | 205 | 210 | 205 | 205 | 220 | 220 | 220 | 215 | 215 | |
| 800 | 210 | 210 | 210 | 215 | 215 | 220 | 210 | 210 | 205 | 205 | 205 | 210 | 210 | 210 | 210 | 205 | 205 | 220 | 220 | 220 | 215 | 215 | |
| 1000 | 210 | 210 | 210 | 215 | 215 | 215 | 210 | 210 | 205 | 205 | 205 | 210 | 210 | 210 | 210 | 205 | 215 | 215 | 220 | 220 | 215 | 215 | |

THROTTLE POSITION

FIG. 6 — IGNITION TIMING

THROTTLE POSITION (y1/x1) vs RPM

| y1/x1 | 0 | 200 | 400 | 500 | 600 | 700 | 800 | 900 | 1000 | 1100 | 1200 | 1300 | 1400 | 1500 | 2000 | 2500 | 3000 | 3500 | 4000 | 4500 | 5000 | 5500 | 7000 | UNITS |
|---|---|---|---|---|---|---|---|---|---|---|---|---|---|---|---|---|---|---|---|---|---|---|---|---|
| 0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | (ms) |
| 50 | 1.5 | 1.5 | 1.5 | 1.5 | 1.5 | 1.5 | 1.5 | 1.0 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | (ms) |
| 100 | 3.0 | 3.0 | 3.0 | 3.0 | 1.0 | 3.0 | 2.5 | 2.0 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | (ms) |
| 150 | 4.0 | 4.0 | 4.0 | 4.0 | 4.0 | 4.0 | 3.5 | 3.0 | 2.0 | 1.5 | 1.5 | 2.5 | 1.5 | 1.5 | 1.5 | 1.5 | 1.5 | 1.5 | 1.5 | 1.5 | 1.5 | 1.5 | 1.5 | (ms) |
| 151 | 0.0 | 0.0 | 0.0 | 0.0 | 0.0 | 0.0 | 0.0 | 0.0 | 0.0 | 0.0 | 0.0 | 0.0 | 0.0 | 0.0 | −1.0 | −2.0 | −2.0 | −2.0 | −2.0 | −2.0 | −2.0 | −2.0 | −2.0 | DEG. BTDC |
| 200 | 4.0 | 4.0 | 4.0 | 4.0 | 6.0 | 6.0 | 8.0 | 10.0 | 18.0 | 15.0 | 14.0 | 20.0 | 18.0 | 20.0 | 20.0 | 20.0 | 20.0 | 20.0 | 20.0 | 18.0 | 18.0 | 18.0 | 18.0 | DEG. BTDC |
| 300 | 4.0 | 4.0 | 4.0 | 4.0 | 6.0 | 6.0 | 8.0 | 10.0 | 16.0 | 16.0 | 16.0 | 17.0 | 20.1 | 18.3 | 20.0 | 20.0 | 18.0 | 20.0 | 20.0 | 18.0 | 30.0 | 24.0 | 24.0 | DEG. BTDC |
| 400 | 4.0 | 4.0 | 4.0 | 4.0 | 6.0 | 6.0 | 8.0 | 10.0 | 16.0 | 16.0 | 14.0 | 17.0 | 17.0 | 18.0 | 18.0 | 18.0 | 18.0 | 18.0 | 18.0 | 22.0 | 26.0 | 28.0 | 28.0 | DEG. BTDC |
| 500 | 4.0 | 4.0 | 4.0 | 4.0 | 6.0 | 6.0 | 8.0 | 9.0 | 14.0 | 14.0 | 14.0 | 15.0 | 17.1 | 18.0 | 18.0 | 18.1 | 18.0 | 18.0 | 18.0 | 18.0 | 26.0 | 28.0 | 28.0 | DEG. BTDC |
| 600 | 4.0 | 4.0 | 4.0 | 4.0 | 6.0 | 6.0 | 8.0 | 1.0 | 14.0 | 14.0 | 14.0 | 14.0 | 17.0 | 18.0 | 10.0 | 16.0 | 18.0 | 18.0 | 18.0 | 22.0 | 24.0 | 10.0 | 30.0 | DEG. BTDC |
| 700 | 4.0 | 4.0 | 4.0 | 4.0 | 6.0 | 6.5 | 7.0 | 7.0 | 12.0 | 14.0 | 14.0 | 14.0 | 16.0 | 16.0 | 16.0 | 16.0 | 18.0 | 18.0 | 18.0 | 20.0 | 26.0 | 28.0 | 28.0 | DEG. BTDC |
| 800 | 4.0 | 4.0 | 4.0 | 4.0 | 6.0 | 6.5 | 7.0 | 7.0 | 12.0 | 14.0 | 14.0 | 14.0 | 16.0 | 16.0 | 16.0 | 16.0 | 18.0 | 18.0 | 18.0 | 20.0 | 26.0 | 28.0 | 28.0 | DEG. BTDC |
| 1000 | 4.0 | 4.0 | 4.0 | 4.0 | 6.0 | 6.0 | 7.0 | 7.0 | 12.0 | 14.0 | 14.0 | 14.0 | 16.0 | 16.0 | 16.0 | 16.0 | 18.0 | 18.0 | 18.0 | 20.0 | 26.0 | 28.0 | 28.0 | DEG. BTDC |

| RPM | IGNITION ON TIME |
|---|---|
| 1000 | 5.0msec |
| 1500 | 5.0msec |
| 2000 | 3.5msec |
| 2500 | 2.5msec |
| 3000 | 2.0msec |
| 3500 | 1.5msec |
| 4000 | 1.0msec |
| 4500 | 1.0msec |
| 5000 | .8msec |
| 5500 | .7msec |
| 6000 | .6msec |

FIG. 8

IGNITION-COIL-ON-TIME (ms)

| y1/x1 | 200 | 400 | 500 | 600 | 700 | 800 | 900 | 1000 | 1100 | 1200 | 1300 | 1400 | 1500 | 2000 | 2500 | 3000 | 3500 | 4000 | 4500 | 5000 | 5500 | 7000 |
|---|---|---|---|---|---|---|---|---|---|---|---|---|---|---|---|---|---|---|---|---|---|---|
| T  0 | 5.0 | 5.0 | 4.0 | 3.0 | 3.0 | 3.0 | 3.0 | 3.0 | 3.0 | 3.0 | 3.0 | 3.0 | 3.0 | 3.0 | 2.5 | 2.0 | 1.5 | 1.0 | 1.0 | 0.8 | 0.7 | 0.5 |
| H  50 | 5.0 | 5.0 | 5.0 | 5.0 | 3.0 | 3.0 | 3.0 | 3.0 | 5.0 | 5.0 | 3.0 | 3.0 | 3.0 | 3.0 | 2.5 | 2.0 | 1.5 | 1.0 | 1.0 | 0.8 | 0.7 | 0.5 |
| R 100 | 5.0 | 5.0 | 5.0 | 5.0 | 3.0 | 3.0 | 3.0 | 3.0 | 5.0 | 5.0 | 5.0 | 5.0 | 3.0 | 3.0 | 2.5 | 2.0 | 1.5 | 1.0 | 1.0 | 0.8 | 0.7 | 0.5 |
| O 150 | 5.0 | 5.0 | 5.0 | 5.0 | 3.0 | 3.0 | 3.0 | 3.0 | 3.0 | 4.0 | 5.0 | 5.0 | 5.0 | 3.0 | 2.5 | 2.0 | 1.5 | 1.0 | 1.0 | 0.8 | 0.7 | 0.5 |
| T 151 | 3.0 | 3.0 | 3.0 | 2.8 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.7 | 0.5 |
| T 200 | 0.5 | 0.5 | 0.5 | 0.5 | 0.5 | 0.5 | 0.1 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| L 300 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| E 400 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| 500 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| P 600 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| O 700 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| S 800 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |
| . 1000 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.6 | 0.6 | 0.6 | 0.6 | 0.6 | 0.5 |

FIG. 9

INJECTION PULSE TIME (ms)

| µL/xl | 200 | 400 | 500 | 600 | 700 | 800 | 900 | 1000 | 1100 | 1200 | 1300 | 1400 | 1500 | 2000 | 2500 | 3000 | 3500 | 4000 | 4500 | 5000 | 5500 | 7000 |
|---|---|---|---|---|---|---|---|---|---|---|---|---|---|---|---|---|---|---|---|---|---|---|
| 0 | 6.000 | 6.098 | 4.619 | 4.579 | 4.400 | 4.299 | 4.299 | 4.299 | 4.300 | 4.300 | 4.300 | 4.300 | 4.299 | 4.299 | 4.299 | 4.299 | 4.299 | 4.299 | 4.299 | 4.299 | 4.299 | 4.299 |
| 50 | 4.818 | 4.818 | 4.818 | 4.719 | 4.419 | 4.449 | 4.450 | 4.479 | 4.499 | 4.519 | 4.519 | 4.519 | 4.519 | 4.519 | 4.519 | 4.519 | 4.519 | 4.519 | 4.519 | 4.519 | 4.519 | 4.519 |
| 100 | 4.848 | 4.848 | 4.848 | 4.848 | 4.748 | 4.400 | 4.320 | 4.270 | 4.250 | 4.250 | 4.220 | 4.220 | 4.250 | 4.230 | 4.230 | 4.230 | 4.230 | 4.230 | 4.230 | 4.230 | 4.230 | 4.230 |
| 150 | 4.830 | 4.830 | 4.830 | 4.830 | 4.830 | 4.769 | 4.739 | 4.649 | 4.599 | 4.499 | 4.339 | 4.400 | 4.319 | 4.480 | 4.480 | 4.480 | 4.480 | 4.480 | 4.480 | 4.480 | 4.480 | 4.480 |
| 151 | 4.860 | 4.860 | 4.860 | 5.099 | 5.080 | 5.009 | 5.049 | 5.080 | 5.100 | 5.080 | 4.880 | 4.840 | 4.840 | 4.789 | 4.789 | 4.650 | 4.530 | 4.420 | 4.340 | 4.250 | 4.140 | 4.700 |
| 200 | 5.200 | 5.200 | 5.200 | 5.250 | 5.180 | 5.149 | 5.199 | 5.149 | 5.099 | 4.999 | 4.949 | 4.899 | 4.899 | 4.899 | 4.899 | 4.749 | 4.649 | 4.449 | 4.399 | 4.350 | 4.200 | 4.799 |
| 300 | 5.199 | 5.199 | 5.199 | 5.349 | 5.249 | 5.199 | 5.299 | 5.249 | 5.249 | 5.199 | 5.190 | 5.099 | 5.099 | 5.149 | 5.199 | 5.199 | 4.949 | 4.749 | 4.649 | 4.549 | 4.349 | 4.599 |
| 400 | 5.299 | 5.299 | 5.299 | 5.499 | 5.399 | 5.329 | 5.449 | 5.399 | 5.399 | 5.399 | 5.299 | 5.299 | 5.399 | 5.549 | 5.649 | 5.649 | 5.399 | 5.299 | 5.049 | 4.849 | 4.700 | 4.749 |
| 500 | 5.500 | 5.500 | 5.999 | 5.549 | 5.449 | 5.379 | 5.549 | 5.499 | 5.499 | 5.550 | 5.449 | 5.499 | 5.599 | 5.799 | 6.049 | 6.199 | 5.899 | 5.799 | 5.549 | 5.349 | 5.150 | 5.049 |
| 600 | 5.500 | 5.500 | 6.050 | 5.600 | 5.500 | 5.429 | 5.600 | 5.550 | 5.550 | 5.550 | 5.550 | 5.550 | 5.700 | 5.850 | 6.100 | 6.349 | 6.000 | 6.000 | 5.699 | 5.450 | 5.150 | 5.200 |
| 700 | 5.500 | 5.500 | 6.050 | 5.600 | 5.500 | 5.429 | 5.600 | 5.550 | 5.550 | 5.550 | 5.550 | 5.550 | 5.700 | 5.850 | 6.100 | 6.349 | 6.099 | 6.000 | 5.749 | 5.450 | 5.150 | 5.149 |
| 800 | 5.500 | 5.500 | 6.050 | 5.650 | 5.500 | 5.429 | 5.600 | 5.550 | 5.550 | 5.550 | 5.550 | 5.550 | 5.700 | 5.850 | 6.100 | 6.349 | 6.099 | 6.000 | 5.749 | 5.450 | 5.150 | 5.149 |
| 1000 | 5.500 | 5.500 | 6.050 | 5.650 | 5.500 | 5.430 | 5.600 | 5.550 | 5.550 | 5.549 | 5.550 | 5.549 | 5.700 | 5.800 | 6.100 | 6.350 | 6.099 | 6.000 | 5.750 | 5.450 | 5.150 | 5.149 |

THRESHOLD PULSES

TIME DELAY IGNITION CIRCUIT FOR AN INTERNAL COMBUSTION ENGINE

CROSS-REFERENCES TO RELATED APPLICATIONS

This Application is a continuation application of International Application Ser. No. PCT/US97/10636, filed Jun. 20, 1997 claiming the benefit of U.S. Provisional application Ser. No. 60/020,032, filed Jun. 21, 1996.

Attention is directed to U.S. patent application Ser. No. 08/507,664, filed Jul. 25, 1995, abandoned.

BACKGROUND OF THE INVENTION

The invention relates to an internal combustion engine, and particularly to an ignition timing circuit for an internal combustion engine.

Spark-ignited internal combustion engines require a spark at the spark plug in order to ignite the fuel and air mixture in the cylinder of the engine. The timing of the combustion event is critical in the operation of the internal combustion engine. Particularly, the timing of the combustion event controls the speed and acceleration of the engine as well as the efficiency with which the fuel in the cylinder is burned. Various methods of timing the combustion event are known. In particular, it is generally known to make use of various engine operating parameters to time the combustion event. Such parameters may include crankshaft angle, engine temperature and/or cylinder pressure.

SUMMARY OF THE INVENTION

In the case of an internal combustion engine utilizing fuel injectors, the air/fuel mixture is atomized into a "stratified" fuel/air cloud that "floats" from the injector nozzle in the cylinder toward the spark gap at the spark plug. If the ignition spark jumps the spark gap before the fuel/air cloud reaches the spark gap, the fuel/air cloud will not be completely burned. In order to assure that complete combustion of the stratified fuel/air cloud is attained, it is necessary to time the ignition spark for the precise moment when the fuel/air cloud reaches the spark gap.

Accordingly, this invention provides an absolute time delay ignition circuit for an internal combustion engine. The time delay ignition circuit bases the timing of the ignition spark on the elapsed time from the fuel injector event. That is, the electronic control unit of the engine generates a signal causing injection of fuel by the fuel injector and subsequently generates a signal causing an ignition spark based on an absolute period of elapsed time measured from the injection signal. The electronic control unit can generate the time delay based upon either a fixed calibrated time period, a predetermined time period stored in a memory based look-up table, or a time period calculated from a software based algorithm that evaluates various parameters such as temperature, pressure, etc.

In one embodiment, the engine is operated with time-based ignition at low speeds, and is operated with crank-angle-based ignition at high speeds, i.e., the change from time-based ignition to crank-angle-based ignition is based solely on engine speed. In another embodiment, the engine is operated with time-based ignition at low engine loads (as measured by throttle position), and is operated with crank-angle-based ignition at high engine loads, i.e., the change from time-based ignition to crank-angle-based ignition is based solely on engine loads. In another embodiment, the engine is operated with time-based ignition at low loads and low speed, and is operated with crank-angle-based ignition at either high loads or high speeds, i.e., the change from time-based ignition to crank-angle-based ignition is based on both the engine speed and engine load.

The invention also provides an internal combustion engine assembly comprising: an internal combustion engine including an engine block having at least one cylinder; a piston mounted within the cylinder for reciprocal movement in the cylinder; a fuel injector for injecting fuel into the cylinder; and circuit means for generating an injection control signal indicative of a fuel injection event and for generating a spark in the cylinder a predetermined amount of time after generation of the injection control signal.

The invention also provides an internal combustion engine assembly comprising: an internal combustion engine including an engine block having at least one cylinder; a piston mounted within the cylinder for reciprocal movement in the cylinder; a fuel injector for injecting fuel into the cylinder; and a circuit for generating an injection control signal indicative of a fuel injection event, the circuit including a timer having a timer output for generating an electrical timing signal, the timing signal having a predetermined duration indicating an amount of time elapsed from generation of the injection control signal.

The invention also provides a method of timing the ignition of fuel in an internal combustion engine, the engine including an engine block having at least one cylinder, a piston mounted within the cylinder for reciprocal movement in the cylinder, a fuel injector for injecting fuel into the cylinder, the method comprising the steps of: (A) initiating an injection event; and (B) generating an ignition signal solely in response to the time elapsed since the injection event.

It is an advantage of the invention to provide an ignition system that bases the timing of the ignition spark on an absolute period of time measured from the fuel injection event.

It is another advantage of the invention to provide an ignition timing system allowing operation of the engine at idling speeds of less than 200 rotations of the crankshaft per minute.

It is another advantage of the invention to provide an ignition timing system that causes efficient and complete combustion of the fuel/air cloud in the cylinder.

It is another advantage of the invention to provide an ignition timing system that is resistant to minor engine speed fluctuations.

Other features and advantages of the invention are set forth in the following detail description and claims.

BRIEF DESCRIPTION OF THE DRAWINGS

These and other features of the present invention will be more fully disclosed when taken in conjunction with the following DETAILED DESCRIPTION OF THE PREFERRED EMBODIMENT(S) in which like numerals represent like elements and in which:

FIG. 5 is a chart illustrating injection timing for the engine of FIG. 4 as measured in degrees before top-dead-center (DBTDC) and plotted as a function of engine speed and throttle position;

FIG. 6 is a chart illustrating ignition timing for the engine of FIG. 4 as measured in DBTDC and plotted as a function of engine speed and throttle position;

FIG. 7 is a chart illustrating the maximum ignition coil on time for the engine of FIG. 4 as measured in milliseconds (ms) and plotted as a function of engine speed;

FIG. 8 is a chart illustrating the ignition coil on time for the engine of FIG. 4 as measured in milliseconds (ms) and plotted as a function of engine speed and throttle position;

FIG. 9 is a chart illustrating the injection pulse time for the engine of FIG. 4 as measured in milliseconds (ms) and plotted as a function of engine speed and throttle position.

Figure 1:
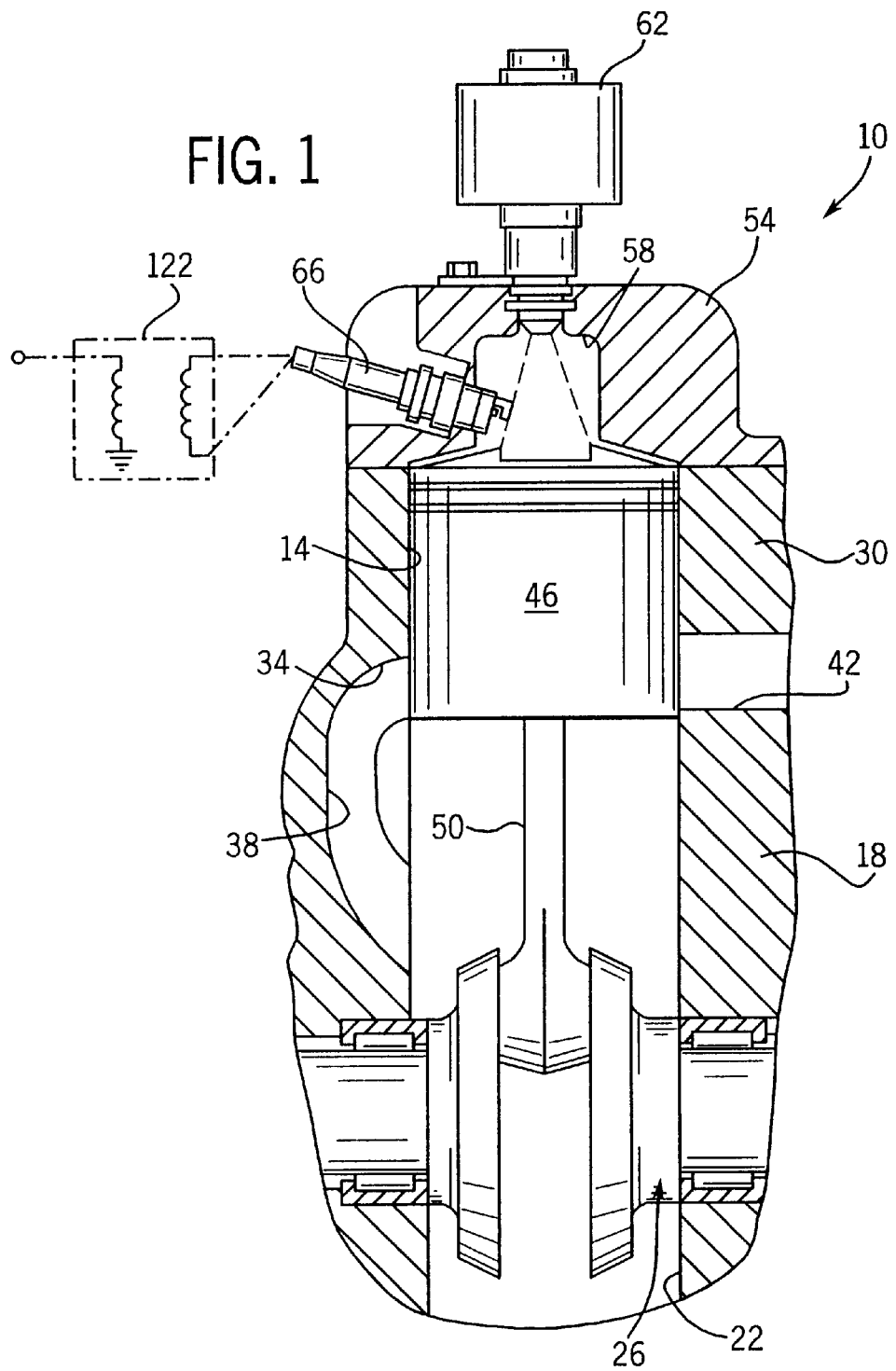
FIG. 1 is a partial cross section of an internal combustion engine embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION OF THE PREFERRED EMBODIMENT(S)

Partially shown in FIG. 1 of the drawings is an internal combustion engine 10. One cylinder 14 of the engine 10 is illustrated in FIG. 1. The engine 10 includes a crankcase 18 defining a crankcase chamber 22 and having a crankshaft 26 rotatable therein. An engine block 30 defines the cylinder 14. The engine block 30 also defines an intake port 34 communicating between the cylinder 14 and the crankcase chamber 22 via a transfer passage 38. The engine block 30 also defines an exhaust port 42. A piston 46 is reciprocally moveable in the cylinder 14 and is drivingly connected to the crankshaft 26 by a connecting rod and crank pin assembly 50. A cylinder head 54 closes the upper end of the cylinder 14 so as to define a combustion chamber 58. The engine 10 also includes a fuel injector 62 mounted on the cylinder head 54 for injecting fuel into the combustion chamber 58. A spark plug 66 is mounted on the cylinder head 54 and extends into the combustion chamber 58.

Figure 2:
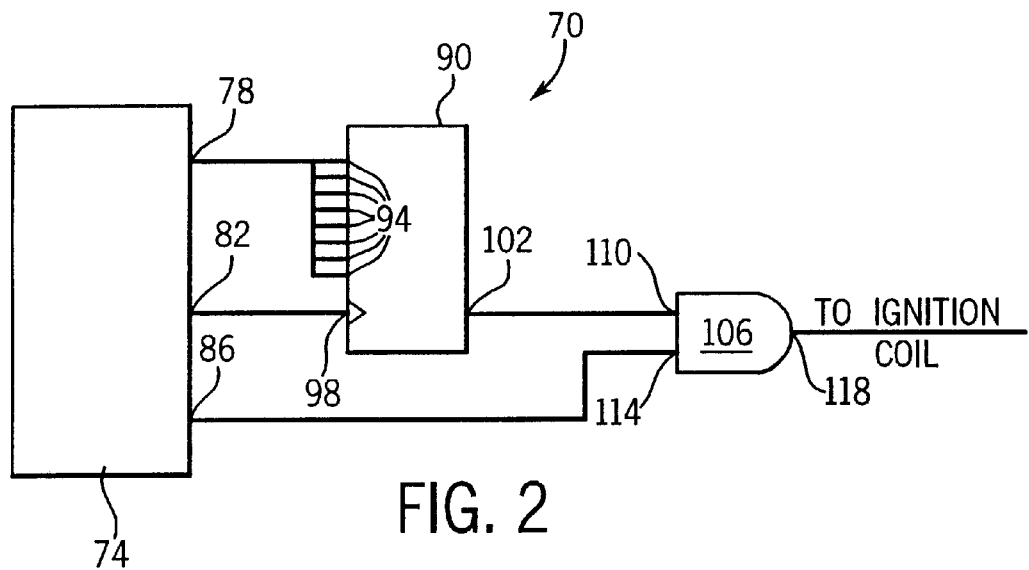
FIG. 2 is an electrical schematic of the time delay ignition circuit for an internal combustion engine having a single cylinder.

The internal combustion engine 10 also includes (see FIG. 2) a time delay ignition circuit 70 for generating a spark in the cylinder 14 at a predetermined moment after the injection of fuel into the combustion chamber 58 has occurred. As shown in FIG. 2, the time delay ignition circuit 70 includes a microprocessor 74 having data outputs 78, an injection indicator output 82, and a spark generating output 86. As described below, the microprocessor 74 generates spark signals at the output 86. It should be understood, however, that the spark signals may be generated by another appropriate component such as an ECU. The circuit 70 also includes a timer 90 having an 8-bit register of data inputs 94 for receiving timing information from the data outputs 78 of the microprocessor 74. The timer 90 also has a trigger input 98 connected to the injection indicator output 82 of the microprocessor 74 to receive from the microprocessor 74 a signal indicating when an injection event has been initiated by the microprocessor 74. The timer 90 also includes a timing pulse output 102.

The time delay ignition circuit 70 also includes an AND gate 106 having two inputs 110 and 114 and an output 118. Input 110 of AND gate 106 is connected to the output 102 of the timer 90. Input 114 of AND gate 106 is connected to the microprocessor 74 to receive from the microprocessor 74 a spark generating signal from spark generating output 86. The output 118 of the AND gate 106 is connected to an ignition coil 122 (shown schematically in FIG. 1) to generate a spark in the cylinder 14 and ignite the fuel in the cylinder 14.

Figure 3:
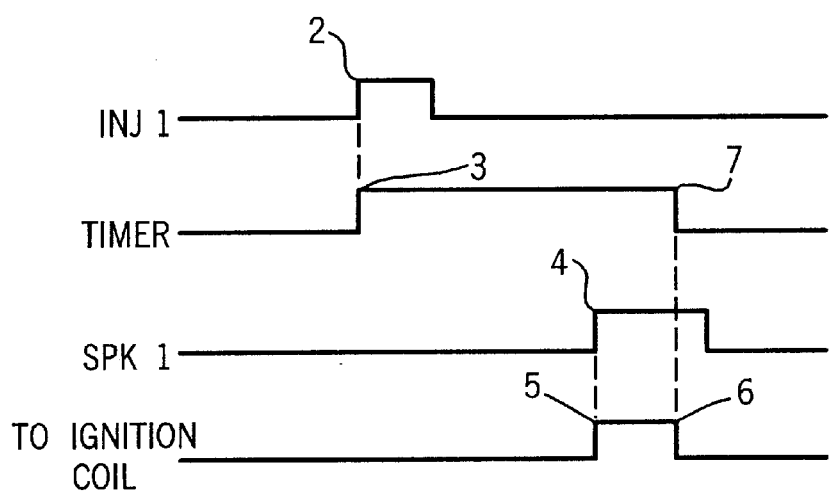
FIG. 3 is a time chart illustrating the time-based relationships between various electronic signals in the time delay ignition circuit.

In operation, when an injection event occurs, the timer 90 receives, from output 82 of microprocessor 74, and injection control signal (see reference numeral 2 in FIG. 3) at the trigger input 98 of timer 90 and, in response to the injection control signal, begins to count the clock pulses from the microprocessor clock signal. As long as the timer count has not expired, the timer 90 generates at the output 102 a high signal or timing signal (see reference numeral 3 in FIG. 3). When the microprocessor 74 generates the spark signal at the output 86 (see reference numeral 4 in FIG. 3), and this spark signal is received at the input 114 to the AND gate 106, the AND gate 106 generates at output 118 an output or ignition signal or current which is transmitted to the ignition coil 122 (see reference numeral 5 in FIG. 3). The output 118 goes low (see reference numeral 6 in FIG. 3) when the output 102 goes low (see reference numeral 7 in FIG. 3). While the output 118 is high, current flowing through the ignition coil rises. The output 102 goes low when the timer count received from the microprocessor has expired, causing the output 118 to go low, i.e., when the microprocessor 74 indicates that the desired amount of time has elapsed since the injection event. Because the current in an inductor or ignition coil cannot change instantaneously ($V=L(di/dt)$), the abrupt change in the current supply to the ignition coil causes the voltage on the ignition coil to quickly rise thereby generating a spark causing ignition of the fuel in the cylinder 14. In order to accommodate various sized engines having various numbers of cylinders, the time delay ignition circuit 70 of FIG. 2 can be repeated as many times as there are cylinders.

While the ignition circuit 70 may be used at any speed, the ignition circuit 70 is preferably used at low or idle speeds, i.e., speeds of 200 to 2000 crankshaft rotations per minute (RPM), and has been shown to operate particularly well at speeds as low as 200 RPM. At speeds above 2000 RPM, the engine is preferably controlled using a conventional crankshaft angle-based ignition system. In both conventional internal combustion engines and the internal combustion engine 10 shown in the drawings, timing of the spark generating signal at such speeds is based solely on the crank angle of the crankshaft. However, in the prior art, the spark generating signal is connected directly to the ignition coil and initiates the ignition spark directly and without the need for any additional signals. The result is that the timing of prior art ignition events is dependent upon crank angle rather than upon absolute time calculated from a fixed point in time. In contrast, the ignition circuit 70 causes ignition to always occur a predetermined amount of time after the injection event occurs, and this predetermined amount of time is not based on the crank angle of the crankshaft. The fuel injection event is the generation of the fuel injection signal at output 86 of microprocessor 74. This may occur either at energization of the fuel injector or upon actual injection of the fuel into the cylinder 14.

Figure 4:
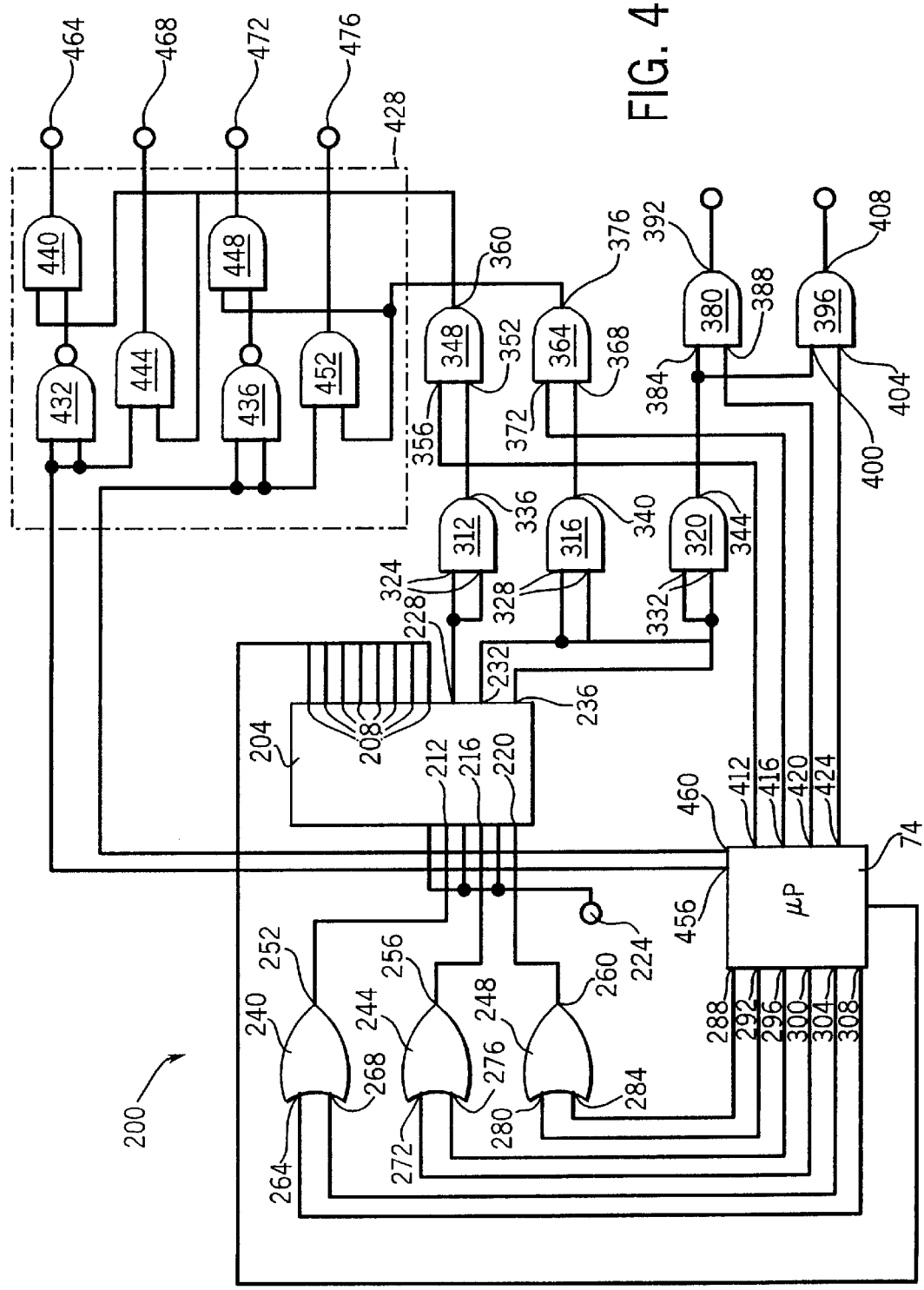
FIG. 4 is an electrical schematic illustrating a time delay ignition circuit for use in connection with an internal combustion engine having six cylinders.

FIG. 4 illustrates a time delay ignition circuit 200 for a six cylinder engine. Like parts are identified using like reference numerals. Rather than repeating the circuit 70 of FIG. 2 six times, the embodiment illustrated in FIG. 4 combines (multiplexes) various signals to achieve some economy in the use of electronic components.

As shown in FIG. 4, the circuit 200 includes a timer 204 having an 8-bit data input register 208, three trigger inputs 212, 216, and 220 corresponding to cylinders one and four, two and five, and three and six, respectively, a clock input 224 and three outputs 228, 232, and 236 corresponding to trigger inputs 212, 216, and 220, respectively. The circuit 200 also includes OR gates 240, 244, and 248 having outputs 252, 256, and 260, respectively, which are connected to trigger inputs 212, 216, and 220, respectively. OR gates 240, 244, and 248 also include inputs 264 and 268, 272 and 276, and 280 and 284, respectively, connected to the microprocessor 74 to receive injection output signals indicating that an injection event has occurred in a given cylinder. That is, the microprocessor generates output signals at outputs 288, 292, 296, 300, 304, and 308 to indicate that injection has occurred in cylinders one, two, five, three, and six, respectively.

The time delay ignition circuit 200 also includes AND gates 312, 316, and 320 having respective pairs of inputs 324, 328, and 332 connected to timer outputs 228, 232, and 236, respectively, and having respective outputs 336, 340, and 344. The time delay ignition circuit 200 also includes AND gate 348 having an input 352 connected to the output 336 of AND gate 312, an input 356 and an output 360; AND gate 364 having an input 368 connected to the output 340 of AND gate 316, an input 372 and an output 376; AND gate 380 having an input 384 connected to the output 344 of AND gate 320, an input 388 and an output 392; an AND gate 396 having an input 400 connected to the output 344 of AND gate 320, and input 404 and an output 408. Inputs 356 and 372 of AND gates 348 and 364, respectively, are connected to the microprocessor 74 to receive the spark signals from outputs 412 and 416, respectively, of microprocessor 74. In time delay ignition circuit 200, the spark signals from the microprocessor for cylinders one and four are multiplexed, i.e., combined, on output 412 and the spark signals for cylinders two and five are multiplexed on output 416. Inputs 388 and 404 of AND gates 380 and 396, respectively, are connected to the microprocessor 74 to receive the spark signals from outputs 420 and 424, respectively, of microprocessor 74. Output 420 generates the spark signal for cylinder three while output 424 generates the spark signal for cylinder six. The outputs 392 and 408 of AND gates 380 and 396, provide the ignition control signals for ignition coils of cylinders three and six, respectively. Alternatively, the ignition control signals for cylinders three and six could be generated by the microprocessor 74 in multiplexed form and combined along with the combined timing output signal at 344 and demultiplexed by a circuit similar to DMUX 428. The outputs 360 and 376 of AND gates 348 and 364, respectively, provide the multiplexed ignition control signals for ignition coils of cylinders one and four and cylinders two and five, respectively.

The time delay ignition control circuit 200 also includes a demultiplexer (DMUX) 428. The DMUX 428 includes AND gates 432 and 436 and AND gates 440, 444, 448, and 452. DMUX receives as inputs the outputs 360 and 376 of AND gates 348 and 364, respectively, and control outputs 456 and 460 of microprocessor 74 to demultiplex the multiplexed ignition control signals for cylinders one and four and two and five that are generated at outputs 360 and 376, respectively. DMUX generates the demultiplexed ignition control signals at outputs 464, 468, 472, and 476 for cylinders one, four, two, and five, respectively.

In operation, the time delay ignition circuit 200 is used at low speeds, i.e., speeds of 200 to 2000 crankshaft rotations per minute (RPM), and has been shown to operate particularly well at speeds as low as 200 RPM. At speeds above 2000 RPM the ignition is preferably controlled using a conventional crankshaft angle-based timing system. The microprocessor supplies an injection signal for cylinder one at input 264 of OR gate 240 and for cylinder four at input 268 of OR gate 240. Thus the injection signals for cylinders one and four are combined at the output 252 of the OR gate 240. Likewise, the injection signals for cylinders two and five are combined at the output 256 of OR gate 244 and the injection signals for cylinders three and six are combined at the output 260 of OR gate 248. The injection signals are input to timer trigger inputs 212, 216, and 220, respectively. Based on multiplexed timing data received from the microprocessor via data inputs 208, a combined timing signal is generated for cylinders one and four at output 228, for cylinders two and five at output 232, and for cylinders three and six at output 236. The combined timing signals are combined with combined spark control signals for cylinders one and four, and cylinders two and five, respectively, to create a pair of combined ignition signals for cylinders one and four, and two and five. DMUX 428 demultiplexes the combined ignition signals to generate an absolute time-based ignition signal for cylinders one, four, two, and five.

The microprocessor also generates separate spark control signals for cylinders three and six at microprocessor outputs 420 and 424, respectively. The spark control signals are input to AND gates 380 and 396 to generate absolute time-based ignition signals for cylinders three and six at outputs 392 and 408, respectively.

While the embodiment described above changes between time-based ignition and crank-angle-based ignition on the basis of engine speed only, one or more of a variety of other engine parameters may be used, either alone or in combination, to determine when to switch between time-based ignition and crank-angle-based ignition. Examples of other appropriate engine parameters include engine load, throttle position or some other appropriate parameter.

FIGS. 5–9 illustrate, in chart form, the injection timing, ignition timing, absolute maximum ignition coil on-time, preferred ignition coil on-time and injection pulse time of a control scheme for the ignition circuit 200. As shown in FIGS. 5–9, the engine operates with time-based ignition at a low percentage of wide open throttle (approximately 15% of wide open throttle or below) and with crank-angle-based ignition at a high percentage of wide open throttle (above approximately 15% of wide open throttle). That is, the change from time-based ignition to crank-angle-based ignition is based solely on the throttle position measured as a percentage of wide open throttle.

The injection timing shown in FIG. 5 is measured in degrees before top-dead-center. When the ignition circuit 200 is operating in the time-based mode, i.e., the throttle position is 150 or less, the injection timing numbers in FIG. 5 represent the number of degrees before top-dead-center that the current begins to flow in the fuel injector coil. When the ignition circuit 200 is operating in the crank-angle-based mode, i.e., the throttle position is greater than 150, the injection timing numbers in FIG. 5 represent the number of degrees before top-dead-center that fuel spray into the combustion chamber begins.

Figure 10:
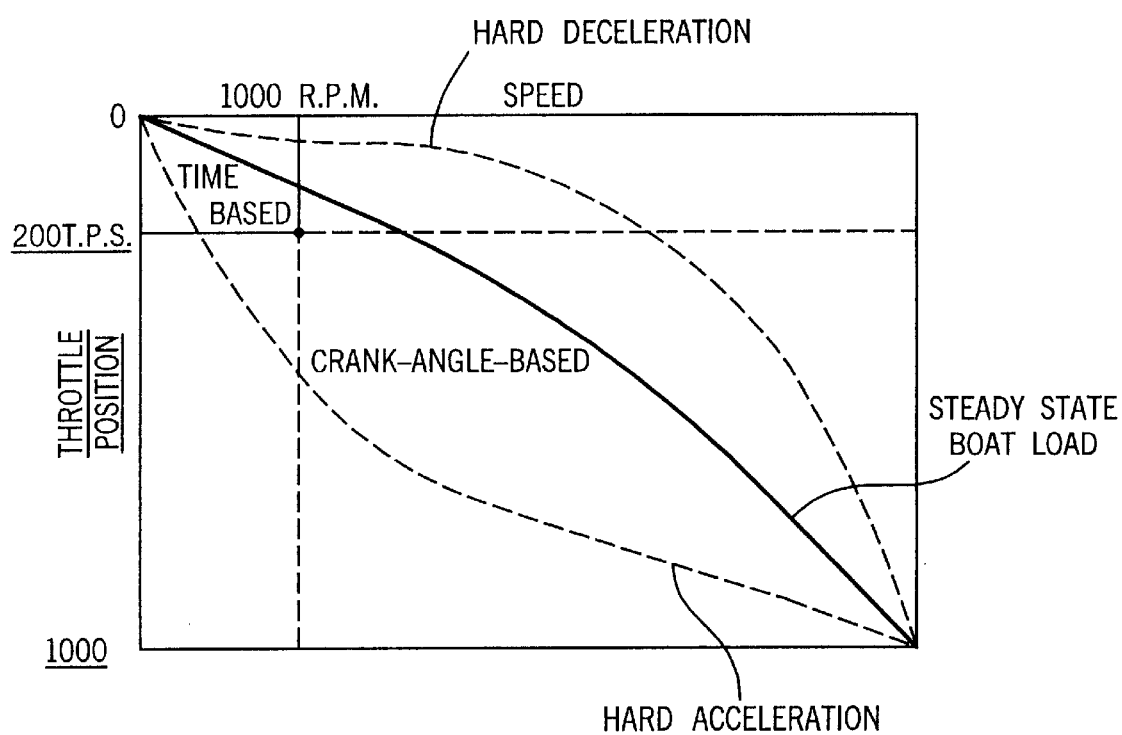
FIG. 10 is a graph showing the transition from time-based ignition to crank-angle-based ignition in the engine of FIG. 4.

FIG. 10 illustrates graphically the change between time-based ignition and crank-angle-based ignition for another alternative control scheme for the ignition circuit 200. As shown in FIG. 10, the engine operates with time-based ignition at a low percentage of throttle position and at low speed, and operates with crank-angle-based ignition at either a high percentage of throttle position or at high speeds. As shown in FIG. 10, ignition is time based if engine speed is below 1000 RPM and operator throttle demand is less than twenty percent (i.e., the throttle position sensor detects a throttle position less than twenty percent of maximum—shown as "200 T.P.S." in FIG. 10). If engine speed is above 1000 RPM or operator throttle demand is greater than twenty percent, ignition is crank-angle-based. This is controlled by the ECU, as described above. It has been found that this "dual strategy" of transition from time-based ignition to crank-angle-based ignition provides good running quality in an outboard motor by crossing over by engine speed and provides good acceleration characteristics by crossing over by throttle position. The preferred ignition system is disclosed in U.S. Ser. No. 60/020,033, filed Jun. 21, 1996, still pending, and titled "MULTIPLE SPARK CAPACITIVE DISCHARGE IGNITION SYSTEM FOR AN INTERNAL COMBUSTION ENGINE", which is incorporated hereby by reference.

Various features and advantages are set forth in the following claims.

The corresponding structures, materials, acts, and equivalents of all means or step plus function elements in the claims below are intended to include any structure, material, or act for performing the function in combination with other claimed elements as specifically claimed.

What is claimed is:

1. An internal combustion engine assembly, comprising:
   an internal combustion engine including an engine block having at last one cylinder;
   a piston mounted within said cylinder for reciprocal movement in said cylinder;
   a fuel injector for injecting fuel into said cylinder; and
   circuit means for generating an injection control signal indicative of a fuel injection event and for generating a spark in said cylinder a predetermined amount of time after generation of said injection control signal;
   wherein said circuit means includes means for measuring the time elapsed since generation of said injection control signal, and means responsive to said elapsed time for generating a spark, including a timer generating a timing signal corresponding to said elapsed time.

2. An internal combustion engine assembly as set forth in claim 1 wherein said circuit means includes a microprocessor having an injector output for generating said injection control signal, and wherein said injector output is connected to said timer to initiate said timing signal.

3. An internal combustion engine assembly as set forth in claim 2 wherein said circuit means further includes means for generating a spark signal, and an AND gate receiving said timing signal and said spark signal.

4. An internal combustion engine assembly as set forth in claim 3 wherein said AND gate generates an ignition current in response to receipt of both said timing signal and said spark signal.

5. An internal combustion engine assembly as set forth in claim 4 wherein said spark is generated when said AND gate stops generating said ignition current.

6. An internal combustion engine assembly as set forth in claim 7 wherein said AND gate stops generating said ignition current when said timer stops generating said timing signal.

7. An internal combustion engine assembly comprising:
   an internal combustion engine including an engine block having at least one cylinder;
   a piston mounted within said cylinder for reciprocal movement in said cylinder;
   a fuel injector for injecting fuel into said cylinder; and
   a circuit for generating an injection control signal indicative of a fuel injection event, said circuit including a timer having a timer output for generating an electrical timing signal, said timing signal having a predetermined duration indicating an amount of time elapsed from generation of said injection control signal.

8. The internal combustion engine assembly as recited in claim 9, wherein the circuit for generating an injection control signal indicative of a fuel injection event generates an ignition current in response to crankshaft position at an engine speed above a predetermined threshold.

9. The internal combustion engine assembly as recited in claim 7, wherein the circuit for generating an injection control signal indicative of a fuel injection event generates an ignition current in response to crankshaft position when an engine condition exceeds a given range.

10. The internal combustion engine assembly as recited in claim 9, wherein the engine condition is engine speed.

11. The internal combustion engine assembly as recited in claim 10, wherein the engine condition is throttle position.

12. An internal combustion engine assembly as set forth in claim 7 wherein said timer includes a trigger input and wherein said circuit includes a microprocessor connected to said trigger input to initiate generation of said timing signal.

13. An internal combustion engine assembly as set forth in claim 12 wherein said circuit includes an AND gate connected to said timer output, said AND gate generating an output signal for initiating a spark in said cylinder.

14. An internal combustion engine assembly as set forth in claim 13 wherein said circuit includes means having a spark output for generating a spark signal, and wherein said AND gate is also connected to said spark output.

15. An internal combustion engine assembly as set forth in claim 14 wherein said AND gate generates an ignition current in response to receipt of both said timing signal and said spark signal.

16. An internal combustion engine assembly as set forth in claim 15 wherein said spark is generated when said AND gate stops generating said ignition current.

17. An internal combustion engine assembly as set forth in claim 16 wherein said AND gate stops generating said ignition current when said timer stops generating said timing signal.

18. A method of timing the ignition of fuel in an internal combustion engine, said engine including an engine block having at least one cylinder, a piston mounted within said cylinder for reciprocal movement in said cylinder, a crankshaft connected to said piston and mounted for rotational movement in response to reciprocal movement of said piston, and a fuel injector for injecting fuel into said cylinder, said method comprising the steps of:
   (A) initiating an injection event;
   (B) measuring the elapsed time from the initiation of the injection event;
   (C) providing a timer generating a timing signal corresponding to the elapsed time; and
   (D) generating an ignition current as a function of the timing signal.

19. A method as set forth in claim 18 and further including the step of generating said ignition current in response to crankshaft position at an engine speed above a predetermined threshold.

20. A method as set forth in claim 18 and further including the step of generating said ignition current in response to crankshaft position when one of two engine conditions exceeds a given range.

21. A method as set forth in claim 20 wherein said two engine conditions are engine speed and throttle position.

22. A method as set forth in claim 18 and further including the step of generating said ignition current in response to crankshaft position when an engine condition exceeds a given range.

23. A method as set forth in claim 22 wherein the engine condition is engine speed.

24. A method as set forth in claim 22 wherein the engine condition is throttle position.

25. A method as set forth in claim 18 wherein said step (A) includes the step of generating an injection control signal in response to said injection event.

26. A method as set forth in claim 25 wherein said step (D) includes the step of generating a spark signal.

27. A method a set forth in claim 26 wherein said step (B) further includes the step of generating said ignition current in response to said timing signal and said spark signal.

28. An internal combustion engine assembly, comprising:
   an internal combustion engine including an engine block having at least one cylinder;
   a piston mounted within the at least one cylinder for reciprocal movement in the at least one cylinder;
   a fuel injector for injecting fuel into at least one cylinder; and
   a circuit for generating an injection control signal indicative of a fuel injection event and for generating a spark in the at least one cylinder a predetermined amount of time after generation of the injection control signal, wherein the circuit includes a timer that measures elapsed time from the generation of the injection control signal and generates a timing signal corresponding to the elapsed time.

29. An internal combustion engine assembly as recited in claim 28 wherein the circuit includes a microprocessor having an injector output for generating the injection control signal, the injector output being coupled to the timer to initiate the timing signal.

30. An internal combustion engine assembly as recited in claim 29, wherein the circuit generates a spark signal.

31. An internal combustion engine assembly as recited in claim 30, the circuit comprising:
   a logic gate that receives the timing signal and the spark signal and generates an ignition current in response to the timing signal and the spark signal.

32. An internal combustion engine assembly as recited in claim 31, wherein the logic gate stops generating the ignition current when the timer stops generating the timing signal.

* * * * *